No. 656,952. Patented Aug. 28, 1900.
P. E. DORNHEIM.
NURLING DIE HOLDER FOR SCREW MACHINES.
(Application filed Apr. 18, 1900.)
(No Model.)
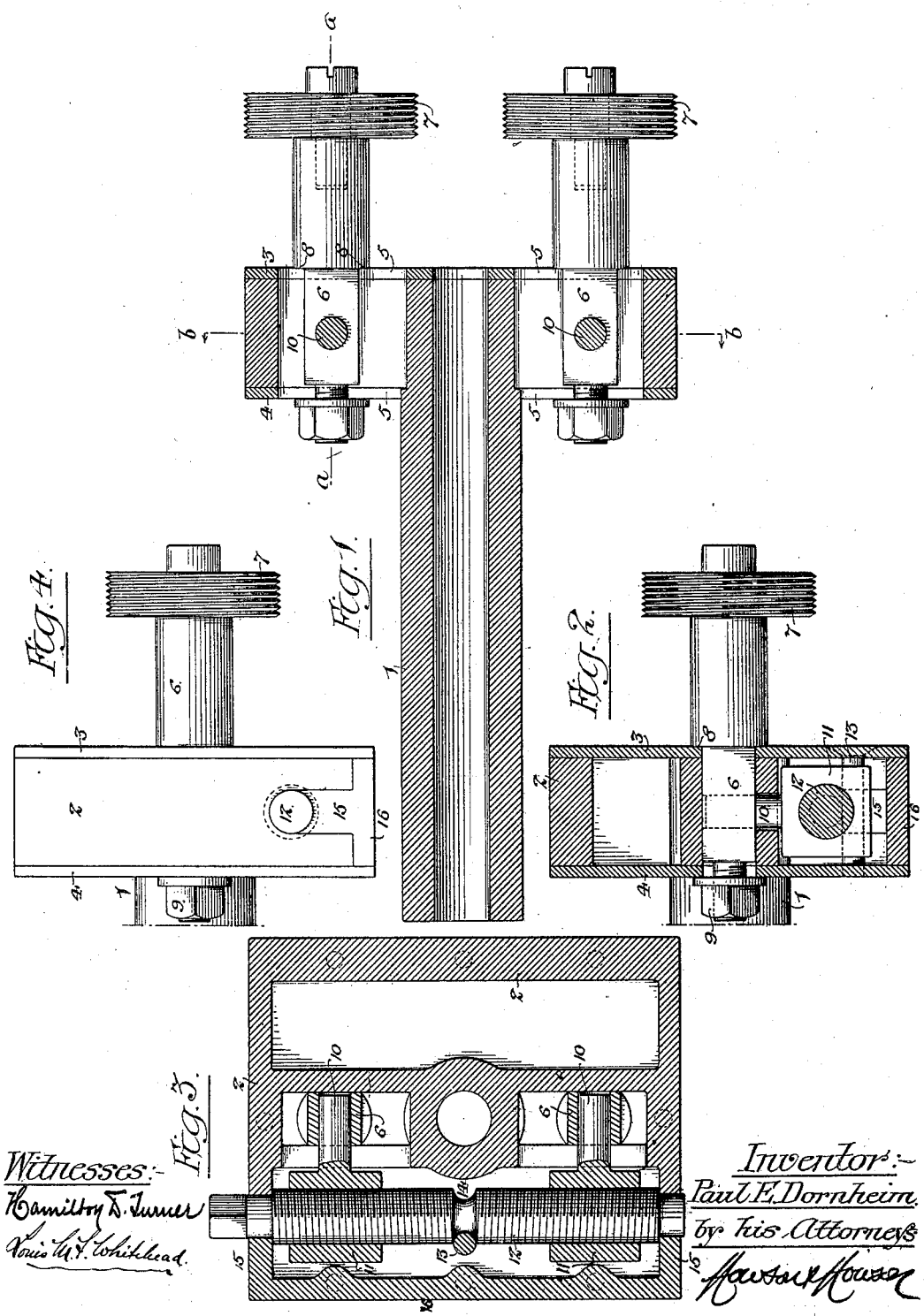

UNITED STATES PATENT OFFICE.

PAUL E. DORNHEIM, OF PHILADELPHIA, PENNSYLVANIA.

NURLING-DIE HOLDER FOR SCREW-MACHINES.

SPECIFICATION forming part of Letters Patent No. 656,952, dated August 28, 1900.

Application filed April 18, 1900. Serial No. 13,339. (No model.)

*To all whom it may concern:*

Be it known that I, PAUL E. DORNHEIM, a citizen of the United States, residing in Philadelphia, Pennsylvania, have invented certain Improvements in Nurling-Die Holders for Screw-Machines, of which the following is a specification.

The object of my invention is to so construct a holder for the nurling-dies of a screw-machine as to provide for the ready adjustment of said dies to suit screw-heads of different diameters and to effect the secure retention of the dies in position after such adjustment. This object I attain in the manner hereinafter set forth, reference being had to the accompanying drawings, in which—

Figure 1 is a vertical sectional view of a nurling-die holder constructed in accordance with my invention. Fig. 2 is a view of the same, partly in elevation and partly in section on the line *a a*, Fig. 1. Fig. 3 is a view partly in elevation and partly in transverse section on the line *b b*, Fig. 1; and Fig. 4 is a side elevation of the holder.

The hollow stem 1 has at the front end a hollow head 2, with front and rear face-plates 3 and 4, these face-plates having transverse slots 5 for the reception of the stems 6, on which the nurling-dies 7 are mounted so as to be free to rotate, each stem being reduced in diameter, so as to form a shoulder 8 for bearing against the front face-plate 3 and being threaded at its rear end for the reception of a nut 9, whereby the stems 6 of the nurling-dies can be securely confined to the holder or carrier.

In order to effect the radial adjustment of the nurling-dies when the nuts 9 have been loosened, the stem 6 of each die has formed in it an opening for the reception of a stud or pin 10, projecting from a nut 11, which engages with a threaded portion of a transverse screw-stem 12, mounted in the head 2 and retained in position by means of a pin 13 engaging with a central groove 14 in said stem, as shown in Fig. 3. One of the threads of the stem 12 is right-handed and the other left-handed. Hence when said stem is turned in one direction or the other the nuts 11, and consequently the stems 6 of the nurling-dies controlled by said nuts, will be caused to move toward or from each other, so that the nurling-dies can be adjusted to act upon a screw-head of any required diameter, the tightening of the nuts 9 after adjustment of the dies securely clamping the stems 6 to the holder or carrier, and therefore preventing any change in the position of the dies during their operation. The head 2 may be slotted and provided with a detachable cap-plate 16 in order to provide for the ready insertion or removal of the screw-stem and its nuts, and said cap-plate may have projecting pieces 15, as shown in Fig. 4, for filling the slots in the head and preventing access of dust or dirt to the interior of the same.

Having thus described my invention, I claim and desire to secure by Letters Patent—

1. The combination of a nurling-die, a shouldered stem carrying the same, a slotted head or carrier providing a bearing for said stem, and a locking-nut, whereby the stem can be adjusted to different positions and secured in position after adjustment, substantially as specified.

2. The combination of the slotted head, with a nurling-die, a stem carrying the same and adjustable from and toward the center of the head, a mandrel carrying said head and having a central opening for the reception of the bolt or screw whose head is to be acted upon, and a screw-stem having a nut with a portion engaging the stem of the die so as to effect adjustment of the latter by turning the screw-stem, substantially as specified.

3. The combination of the slotted head, a nurling-die, a stem carrying said die and passing through said slotted head and having a shoulder and a nut whereby it may be clamped thereto, and a screw-stem having a nut with portion engaging the stem of the die, whereby adjustment of the latter may be effected by turning the screw-stem, substantially as specified.

4. The combination of the nurling-dies and their stems, the slotted head, the screw-stem and its nuts, and a detachable cap-plate having filling-pieces for the slots through which said stem is introduced into the head, substantially as specified.

In testimony whereof I have signed my name to this specification in the presence of two subscribing witnesses.

PAUL E. DORNHEIM.

Witnesses:
F. E. BECHTOLD,
JOS. H. KLEIN.